United States Patent [19]

Kucharczyk

[11] 4,257,319
[45] Mar. 24, 1981

[54] ROOM VENTILATING DEVICE

[75] Inventor: Eckhard Kucharczyk, Netphen, Fed. Rep. of Germany

[73] Assignee: Siegenia-Frank KG, Siegen, Fed. Rep. of Germany

[21] Appl. No.: 902,854

[22] Filed: May 4, 1978

[30] Foreign Application Priority Data

May 9, 1977 [DE] Fed. Rep. of Germany ....... 2720739

[51] Int. Cl.³ .............................................. F24F 7/00
[52] U.S. Cl. .......................................... 98/37; 49/31; 251/134; 181/224
[58] Field of Search .................... 98/33 R, 37, 40 VT, 98/42; 236/49; 251/134; 49/2, 31; 181/224, 218; 73/23

[56] References Cited

U.S. PATENT DOCUMENTS 2,566,784  9/1951  Waff .......................................... 98/42
3,011,718  12/1961  Joerren et al. ..................... 236/49 X
3,282,557  11/1966  Capps ................................... 251/134

FOREIGN PATENT DOCUMENTS 2331841  1/1975  Fed. Rep. of Germany ........... 181/224
7504175  6/1975  Fed. Rep. of Germany ........... 181/224

*Primary Examiner*—Albert J. Makay
*Assistant Examiner*—Henry Bennett
*Attorney, Agent, or Firm*—Norman S. Blodgett; Gerry A. Blodgett

[57]  ABSTRACT

Ventilating device for rooms having air passage apertures and closure means movable by an electric drive between an open position and a closed position, a noxious gas sensor and electrical control means responsive to the gas sensor for operating the electric drive so that the closure means is moved to the open position when the gas sensor senses noxious gas concentration in the room above a predetermined level.

4 Claims, 4 Drawing Figures

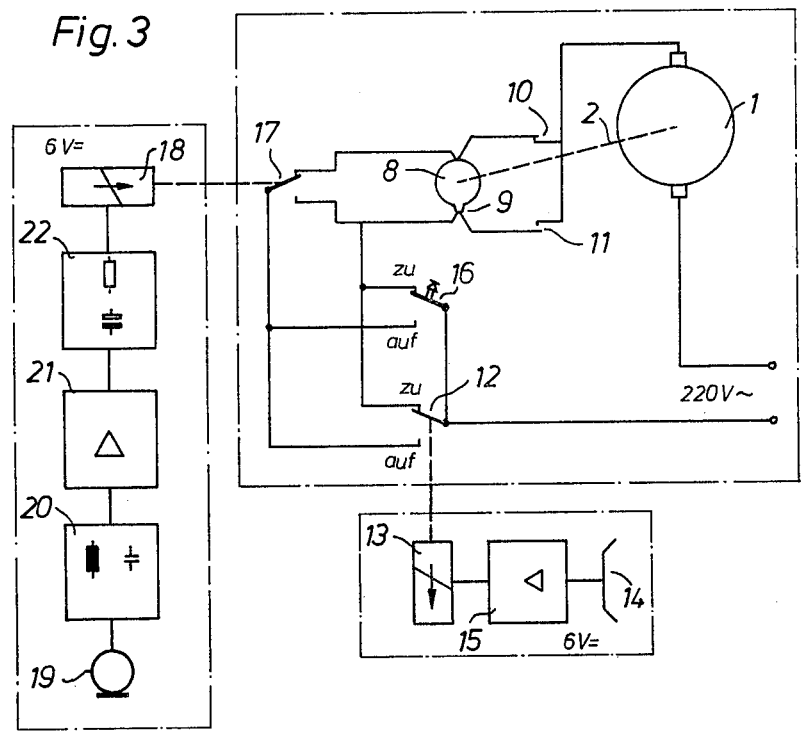
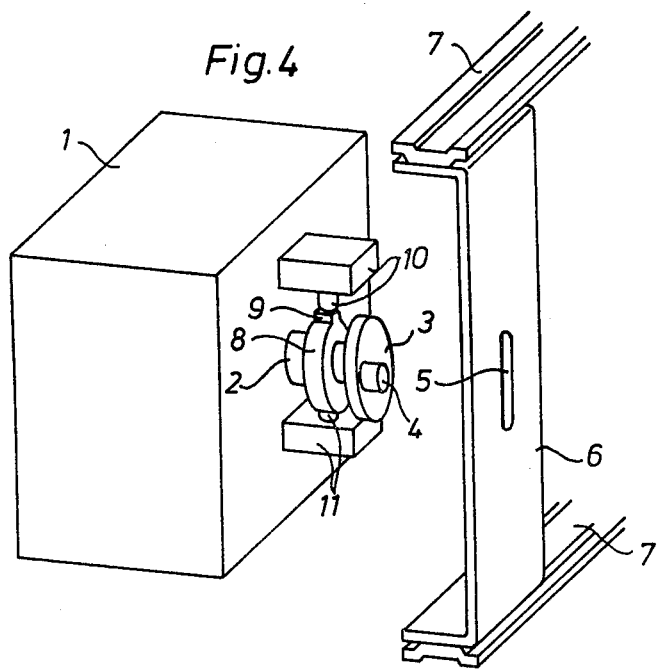

ROOM VENTILATING DEVICE

BACKGROUND OF THE INVENTION

The invention relates to a room ventilating device, whose air passage apertures or ducts can selectively be opened or closed by means of an electric drive.

Such ventilating devices can be so designed that they can be directly inserted as automatic units in recesses of building walls. It is however also possible to integrate such ventilating devices in windows or doors or the like so that they can be installed with them in corresponding openings of the building walls.

Such ventilating devices serve the purpose of effecting an exchange of air between the building interior and the environment, i.e. to conduct away the stale air from the room interior into the environment and to introduce a corresponding amount of fresh air from the environment into the room interior. In the simplest case they are designed as so-called continuous vents which on released air passage apertures effect the air exchange on the basis of the pressure or temperature drop existing between the room interior and the environment. On the other hand, they can however also be constructed as forced ventilators which generate the desired air currents through, for example, electrically driven ventilators or the like.

The releasing or shutting of the air passage apertures or ducts is effected on the ventilating devices of the species either through manual actuation of mechanical adjusting devices or else, when electric drives are used, through manual actuation of a switch which determines the specific control position.

In every case however rests the actuation of the ventilating devices on a human act of volition, for example, of the persons occupying the respective room. This act of volition is hereby essentially determined by the sensations of comfort, experienced by the persons occupying the room, which in turn may be individually quite different and which can result in problems, especially when a room is simultaneously used by several persons.

It is a principal object of the invention is to bring about with the aid of the ventilating device of the species an optimal air exchange between the building interior and the environment, and to make this as much as possible independent of individual sensations of comfort or acts of volition.

SUMMARY OF THE INVENTION

This problem is solved in accordance with the invention in a simple manner in that in the supply main for the electric drive a switch contact is employed instead of the master switch or connected parallel to the master switch. The switch contact spontaneously energizes a drive through a circuit which comprises an electrochemical or electronic gas sensor arranged in the room and an amplifier or voltage multiplier. The drive is currentless when the air passage apertures or ducts are closed, and is energized when the air in the room exceeds a predetermined or predeterminable gas concentration to open the apertures or ducts. When the gas concentration falls below this limit, the drive is energized for shutting of the apertures or ducts.

The gas sensor is hereby preferably responsive to carbon dioxide ($CO_2$) which is contained in stale air in a higher concentration than in fresh air.

Ventilating devices of this species are nowadays frequently installed in a sound-quieting construction. These sound-quieting ventilating devices are used in the environment of the building where strong noises occur continuously, or even only occasionally, which must be kept away as much as possible from the building interior. Ventilating devices of this kind which have become known, for example, through the DT-OS No. 23 31 841 and the DT-Gbm No. 75 04 175, exhibit, to be sure, a high degree of efficiency on usual environmental noise. In the opened position they are however still sensitive to momentarily occurring noise peaks because, despite the linings provided, sound waves can still enter through the free cross-section of the air passage apertures or ducts.

To keep away the sound waves from the room interior also on occurring noise peaks in the environment there has been proposed by the patent application No. P 27 19 144.2 a sound sensor, e.g. a microphone, and a circuit comprising a time switch assembly that can be triggered by it, which spontaneously energizes a drive on occurring air-transmitted sound. The drive, that is currentless when the air passage apertures or ducts are open, is energized for closing of the apertures or ducts, and subsequently with delay, is again energized for opening the apertures or ducts. The time switch assembly actuates hereby a relay with a make-break-contact which in its rest or inactive state, connects a microswitch for actuating the drive so that the air passage apertures or ducts are open, but which in its switching or active state, connects a microswitch for actuating the drive so that the air passages apertures or ducts are closed.

In case of use of sound-quieting ventilating devices provided with such a circuit, it is according to the invention of essential importance that the switch contact lies in the supply main that is continually connected with the make-break-contact. In that case, it is possible to keep away all disturbing environmental noises from the room interior, while automatically effecting an optimal air exchange between the environment and the room interior.

BRIEF DESCRIPTION OF THE DRAWINGS

FIG. 3 shows a second modification of the control circuitry including sound sensing means, and FIG. 4 shows a detailed embodiment of the driving device.

DESCRIPTION OF THE PREFERRED EMBODIMENT

Figure 1:
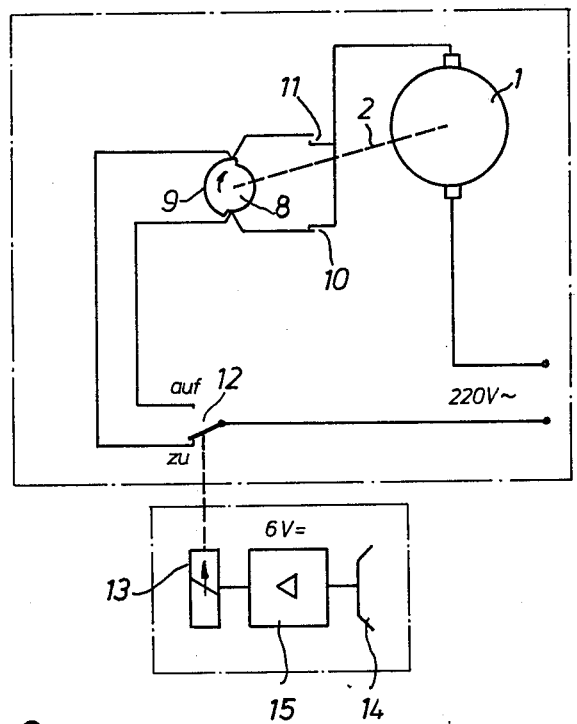
FIG. 1 shows a block diagram of the invention including control circuitry in correlation with noxious gas sensing means and electric drive for the closing member of a ventilating device.

In FIG. 4 of the drawing there is shown, as an example for the application of the invention, an electric-motor drive for the movement of the closing member for the air passage apertures or ducts of a ventilating device. This drive comprises an a.c. induction motor 1, which is preferably built as a geared motor and laid out for a voltage of 220 V at a power input of 25 W.

On the drive shaft 2 of the geared motor 1 sits on the one hand a crank disc 3, whose crank pin 4 engages with an elongated slot 5 of a slide 6, which in turn is in communication with push rods 7 for the movement of the (not depicted) closing member.

Also keyed to the shaft 2 is a cam plate 8 with a peripheral cam 9, which cooperates with two microswitches 10 and 11, which are mounted, for example, at the housing of the geared motor 1.

The arrangement of the micro-switches 10 and 11 relative to each other and to the cam plate 8 is so made that the microswitch 10 above the peripheral cam 9 is only opened at the moment when the closing member of the ventilating device has reached its opening position. It then remains open until the closing member has again been put back into its locking position. On the other hand, the microswitch 11 is opened, and is only closed after the closing member has reached its opening position. It then remains closed until the closing member has again reached its locking position and is then opened through the peripheral cam 9 of the cam plate 8.

On the circuit of FIG. 1 the two microswitches 10 and 11 are selectively energized through a switch contact 12. When the switch contact 12 connects the closed microswitch 10, then the closing member of the ventilating device is moved through the geared motor 1 from its closing position in opening direction until the microswitch 10 is opened through the peripheral cam 9 of cam plate 8 and the microswitch 11 is simultaneously closed. The closing of the microswitch 11 has however no consequences for as long as the switch contact 12 remains connected with the microswitch 10. When however the switch contact 12 connects the closed microswitch 11 to the main, then the geared motor 1 receives current and moves the closing member of the ventilating device from its opening position back into its locking position. When the latter has been reached, the microswitch 11 opens, while microswitch 10 closes.

The switch contact 12 is constructed as a make-break-contact and is actuated through a relay 13. In the rest or inactive position of this relay 13 the switch contact 12 is thereby connected with the microswitch 11, which is opened in the locking position of the closing member of the ventilating device.

When the relay 13 is activated the switch contact 12 is connected with the microswitch 10, which is closed in the locking position of the closing member. Thereby, the geared motor 1 receives current and moves the closing member of the ventilating device into its opening position. Since at this moment the microswitch 10 opens, the closing member remains in the opening position until the relay 13 is de-activated and through the switch contact 12 and the closed microswitch 11 energizes the geared motor 1 to move the closing member to its open position.

The activation of the relay 13 is effected through a sensor 14 which is preferably responsive to carbon dioxide gas ($CO_2$), which operates, for example, on electro-chemical basis and generates a control current when a predetermined or predeterminable gas concentration is exceeded. This current is delivered to an amplifier circuit 15 which in turn gives current to the relay 13, and this, until the sensor 14 reacts to the increased gas concentration. If through the air exchange the gas concentration is reduced, then the electrochemical reaction of the sensor 14 stops and its control current disappears. Relay 13 is de-activated and thereby sets the switch contact 12 from its working position back into its rest position.

Figure 2:
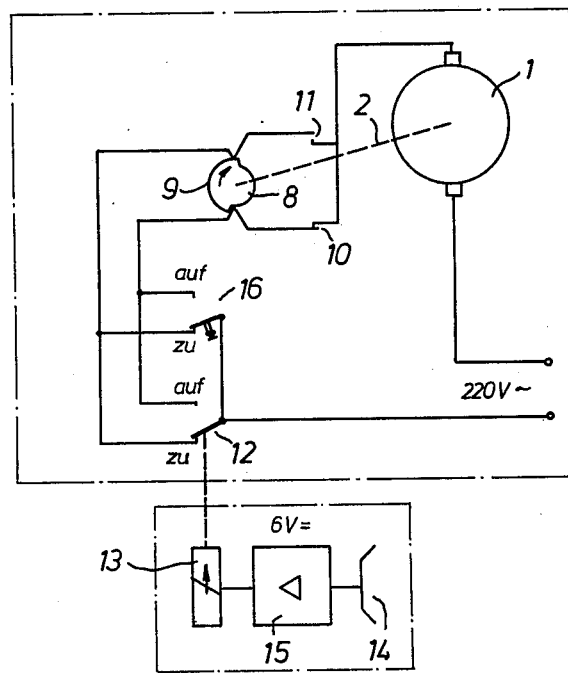
FIG. 2 shows a first modification of the control circuitry.

The circuit of FIG. 2 differs from that of FIG. 1 merely in that, a manually actuated switch 16 is connected to the supply main. Switch 16 is selectively connected with the microswitch 10 or the microswitch 11, and thereby enabling the ventilating device to be opened or closed, independent of the response of the gas sensor 14.

FIG. 3 of the drawing shows a circuit that opens and closes the closing member of the ventilating device not only in dependence on the carbon dioxide concentration in the room, but that also reacts to noise peaks outside of the room that is to be ventilated. In this circuit the switch contact 12, that is actuable through the relay 13, and the manually actuated switch 16 connected in parallel with contact 12, are topped by a make-break-contact 17, which is connected in its rest position with the microswitch 10 and in its working position with the microswitch 11. The relay 18 is affected by a sound sensor 19 through a filter circuit 20, an amplifier 21 and a time switch assembly 22.

When a sound event occurs that contains frequencies which would pass the filter circuit 20, then through amplifier 21 the time switch assembly 22 becomes activated, which reverses the relay 18 from its rest or inactive position into its working or active position. Thereby the make-break switch 17 goes from its rest position into its working position and connects the microswitch 11 with the main. This delivers current to the geared motor 1, whereupon the latter moves the closing member of the ventilating device into its closing position. When the time switch assembly 22 becomes ineffective, the relay 18 is de-activated and the make-break-contact 17 goes to its rest position. It connects the now closed microswitch 10 with the main, which delivers current to the geared motor 1 in order to bring the closing member of the ventilating device again into its opening position.

Through the interaction of the circuit which actuates the switch contact 12 with the circuit which actuates the make-break-contact 17 the ventilating device is, on the one hand, opened or closed in dependence on the gas concentration in the room, and, on the other hand, closed for a specific time when a sound event arises.

The latter occurs thereby independent of the fact whether now the closing member of the ventilating device has been brought into opening position through the switch contact 12 of the gas-responsive circuit or however through the manually actuated switch 16.

The above-described control which is responsive to gas concentrations in the room that is to be ventilated can be used everywhere where an optimal exchange of air independent of human volition is of advantage. This is the case, for example, in bedrooms during the night-time, in hospitals or also in work areas.

I claim:
1. Ventilating device for rooms having air passage apertures and closure means slidable between a closed position in which it is effective to block the apertures and an open position in which the apertures are unblocked, said ventilating device comprising:
   (a) an electric drive for reciprocating the closure means between said open and closed positions,
   (b) an electric supply main,
   (c) a noxious gas sensor for producing an electrical signal when the noxious gas concentration in the room to be ventilated reaches a predetermined level,
   (d) a first switch connected to the electrical drive,
   (e) a second switch connected to the electrical drive,
   (f) a cam operatively connected to the electric drive for simultaneous movement with said electric drive, said cam being effective to close the first switch and open the second switch when the closure means is at the closed position and during movement of the closure means to the open position, and being effective to open the first switch and close the second switch when the closure means is at the open position and during movement of the closure means to the closed position, (g) a primary relay connected to the noxious gas sensor for receiving said electrical signal, said relay having an inactive state in the absence of said electrical signal and an active state when receiving said electrical signal, said relay having a contact which is effective to connect the first switch to the electric supply main only when the relay is in said inactive state and effective to connect the second switch to the electrical supply main only when the relay is in said active state, whereby said apertures will be unblocked when the noxious gas concentration in the room reaches said predetermined level and blocked when the noxious gas concentration in the room is below said predetermined level, (h) a sound sensor for producing a second electrical signal when the environmental sound reaches a predetermined volume, and (i) electrical circuitry operatively connected to said primary relay and first and second switches and responsive to said second electrical signal for shifting said closure means from said open position to said closed position for a predetermined time period.

2. Ventilating device as recited in claim 1, wherein the electric device has a rotating shaft and the cam comprises a disc mounted on the shaft for rotation therewith, said disc having a first surface for alternately opening said first and second switches and a second surface for alternately closing said first and second switches.

3. Ventilating device as recited in claim 1, wherein the electrical circuitry comprises:

(a) an electrical connecting line which is connected to said electric supply main through said contact when the primary relay is in said active condition, (b) a secondary relay having a normally inactive state and an active state and including a contact which is effective to connect the first switch to said electrical connecting line when the secondary relay is in the inactive state and effective to connect the second switch to said electrical connecting line when the secondary relay is in the active state, (c) a normally inactive time switch assembly connected to the sound sensor for receiving said second electrical signal and becoming activated for said predetermined time period upon receiving said second electrical signal, said time switch assembly being connected to the secondary relay for changing said secondary relay from its normally inactive state to its active state while said time switch is activated so that said first switch will be disconnected from said electrical supply main and said second switch will be connected to said electrical supply main when the primary relay is in the active state and the closure means is in the open position, whereby the closure means will be shifted to the closed position for said predetermined period.

4. Ventilating device as recited in claim 1, wherein said noxious gas sensor includes an amplifier circuit for increasing the voltage of said electrical signal.

* * * * *